United States Patent [19]

Scoggins et al.

[11] Patent Number: 4,851,142
[45] Date of Patent: Jul. 25, 1989

[54] FLUID LOSS ADDITIVE FOR WELL DRILLING FLUIDS

[75] Inventors: William C. Scoggins, Celle; Claus P. Herold, Mettmann; Heinz Mueller, Monheim, all of Fed. Rep. of Germany

[73] Assignee: Henkel Kommanditgesellschaft auf Aktien, Duesseldorf, Fed. Rep. of Germany

[21] Appl. No.: 191,516

[22] Filed: May 9, 1988

[30] Foreign Application Priority Data

May 9, 1987 [DE] Fed. Rep. of Germany ....... 3715574

[51] Int. Cl.$^4$ ................................................. C09K 7/06
[52] U.S. Cl. .................... 252/8.515; 252/8.511; 556/42; 556/44; 556/54; 556/55
[58] Field of Search ....... 252/8.511 APS, 8.515 APS; 556/42, 44, 54, 55

[56] References Cited

U.S. PATENT DOCUMENTS

| | | | |
|---|---|---|---|
| 3,168,475 | 2/1965 | Jordan et al. ......................... | 252/8.5 |
| 3,281,458 | 10/1966 | Jordan et al. ......................... | 260/501 |
| 3,494,865 | 2/1970 | Andrews, Jr. et al. ............... | 252/8.5 |
| 3,671,427 | 6/1972 | Andrews, Jr. et al. ......... | 252/8.5 M |
| 3,755,447 | 8/1973 | Klemann et al. ..................... | 260/563 |
| 3,766,229 | 10/1973 | Turner et al. ..................... | 556/54 X |
| 4,421,655 | 12/1983 | Cowan ............................ | 252/8.5 M |
| 4,594,169 | 6/1986 | Saito et al. .................. | 252/8.511 X |
| 4,597,878 | 7/1986 | House et al. ..................... | 252/8.5 M |
| 4,618,433 | 10/1986 | Allison, III ................... | 252/8.511 X |

FOREIGN PATENT DOCUMENTS

| | | | |
|---|---|---|---|
| 0049484 | 12/1984 | European Pat. Off. | |
| 0120678 | 7/1984 | Japan ................. | 252/8.511 |
| 8800584 | 1/1988 | PCT Int'l Appl. ............. | 252/8.515 |

*Primary Examiner*—John F. Terapane
*Assistant Examiner*—Gary Geist
*Attorney, Agent, or Firm*—Ernest G. Szoke; Wayne C. Jaeschke

[57] ABSTRACT

An additive for drilling fluids employed in the deep well drilling industry, which additive comprises an organometal compound of titanium, zirconium or vanadium with humic acid and a further organic moiety which is at least one of fatty acid alkoxylates, fatty alcohol polyalkylene glycol ethers, long-chain amine alkoxylates optionally substituted with a hydroxyl group, or water-insoluble polyalkoxylate all of which are optionally mixed with fatty acids, and fatty acids alone, these having optionally been applied onto an inorganic carrier, mandatorily in the case of fatty acids alone. The fluid loss additive prevents the drilling fluid from streaming into porous drill formations. The additive may be prepared by the reaction of a metal alcoholate with a compound providing the organic moiety and humic acid or a humic acid-containing product.

30 Claims, No Drawings

FLUID LOSS ADDITIVE FOR WELL DRILLING FLUIDS

BACKGROUND OF THE INVENTION

1. Field of the Invention

This invention relates to an additive for well drilling fluids, to a process for preparing such an additive, and to the use of such an additive for the preparation of drilling fluids protected from loss of liquid.

2. Statement of Related Art

Deep well drilling industries use drilling fluids to convey tailings to the surface, to compensate the liquid or gas pressure of the formation, to cool the drill bit, to stabilize the geological formation and to reduce friction between the drilling pipe and the formation.

Two types of drilling fluids are basically distinguished, namely a water-based fluid and an oil-based fluid. As is already apparent from the name, the water-based fluid is a drilling fluid which contains water as the main component, the rheological/chemical properties of which are altered, in accordance with the requirements, by the addition of various additives.

In contrast thereto, the oil-based fluid contains diesel oil or so-called "clean oil" as the main component (apart from the weight-increasing material). This type of fluid is modified, analogous to water-based fluids, with rheology-changing additives which, however, due to the hydrophobic nature of the base component, are of a different chemical composition.

In recent years, oil-based drilling fluids have been used to an increasing extent: Today in oil fluids neat oil is not used as the liquid phase, but rather a water-in-oil emulsion, the oil being the continuous phase.

Such inverse emulsions mostly have an oil/water ratio of about 80/20, although they may be employed at an oil/water ratio of 60/40.

Which fluid type is employed will depend not only on the chemical, thermal and mechanical peculiarities of the respective drill hole, but will also be determined by ecological and other aspects.

There are a variety of additives which may be added to both types of fluids in order to determine the properties thereof. One such additive is a "fluid loss additive". This is an additive which prevents the fluid from streaming into the often porous formation under the action of temperature and pressure.

Such a loss in fluid not only involves financial drawbacks because of the lost drilling fluid, but may also deteriorate the total stability of the drilling hole by washing out the formation, loss in back pressure, and the like, and thus adversely affect the environment.

Numerous humic acid derivatives have been disclosed as suitable for use as a fluid loss additive.

U.S. Pat. No. 3,168,475 (and corresponding German published patent application 11 81 707) disclose a process for the preparation of humate salts with substituted amines, wherein lignite is digested with an alkaline aqueous solution and, after neutralization, is reacted with an ammonium salt in aqueous solution.

German published patent application 12 49 788, also corresponding to U.S. Pat. No. 3,168,475, relates to a process for the treatment of an oil-containing drilling fluid wherein the latter, in order to avoid excessive oil losses, is admixed with a humate which is a salt of humic acid with higher amines.

European published patent application 49,484 discloses a process for the preparation of an additive for reducing fluid losses for oil-based drill hole working fluids. The additive is prepared by mixing brown (lignite) coal or humic acid with an oil-soluble or oil-dispersible amine salt, amide-amine or amide-amine salt.

Further amine and amide derivatives have been disclosed in the U.S. Pat. Nos. 3,281,458; 3,755,447; 3,671,427; 4,597,878; and 3,494,865.

U.S. Pat. No. 4,421,655 discloses a fluid loss additive consisting of a polyphenol compound which may be humic acid, certain ammonium compounds and a polyvalent metallic cation. The cation may be calcium, magnesium, iron, zinc, nickel, chromium or aluminum; calcium being preferred.

The various known additives are generally prepared by heating in the presence of a solvent.

German patent application 37 11 959.8, is commonly assigned, and although mentioned in the German priority document to the present disclosure is unpublished as of the filing date of the present disclosure and therefore is not prior art. It describes an additive to drilling fluids containing an organometal compound having the general formula:

wherein

M is titanium, zirconium or vanadium,

L is a humic acid moiety,

R is $C_{1-6}$ alkyl, and preferably $C_3$- or $C_4$-alkyl,

X is a long-chain fatty acid residue OOCR'; a long-chain aliphatic or aromatic sulfonic acid residue —$SO_3R''$; a long-chain alcohol residue —OR'; a long-chain amidoamine residue R'''NCOR'; or a long-chain amine residue —NR'R'; wherein R' is $C_{10-22}$ (preferably $C_{14-18}$) alkyl or alkenyl, R'' is aryl or R', and R''' is H or a $C_{1-22}$ (preferably $C_{1-18}$) alpihatic and x is 1, 2, 3 or 4, z is 1, 2, 3 or 4, y v-x-z, v being the valence of M, wherein no inorganic carrier for the additive is present, as well as its preparation and its use as a "fluid loss agent."

SUMMARY OF THE INVENTION

Other than in the operating examples, or where otherwise indicated, all numbers expressing quantities of ingredients or reaction conditions used herein are to be understood as modified in all instances by the term "about".

The present invention provides a novel fluid loss additive, which is at least one organometal compound having the general formula

wherein:

M is titanium, zirconium or vanadium, preferably titanium, most preferably titanium (IV);

x is an integer from 1 to 4;

z is an integer from 1 to 4;

Y is v-(x+z), where v is the valence of M; preferably 4;

L is at least one humic derivate moiety;

R is a $C_{1-10}$ alkyl, preferably a $C_3$ alkyl or $C_4$ alkyl, most preferably propyl, isopropyl, or butyli;

X is (1) a fatty acid alkoxylate residue —(A)-$_p$—$OOCR^1$; (2) a fatty alcohol polyalkylene glycolether residue —(A)$_p$—$OR^2$; (3) an aminoalkoxylate reside $-(A)_q-NHR^1$, which optionally is substituted with a hydroxyl; (4) a water-insoluble polyalkoxylate residue $-(A)_r-Y$; (5) a mixture of (1) to (4); all of which optionally have been admixed with at least one fatty acid, or (6) a fatty acid residue $-OOCR^1$;

$R^1$ being a $C_{5-40}$ (preferably $C_{12-22}$) alkyl or a $C_{5-40}$ (preferably $C_{12-22}$) alkenyl, $R^2$ being a $C_{8-22}$ (preferably $C_{12-22}$) alkyl or a $C_{8-28}$ (preferably $C_{12-22}$) alkenyl, A being at least one alkylene oxide adduct selected from the group consisting of ethylene oxide, propylene oxide or butylene oxide, more preferably two or more of these adduct having been combined, Y being the moiety of a $C_{1-6}$ (i.e. "short-chain") starter molecule which is a mono, di-, or polyhydric alcohol such as glycol glycerol or other polyols, a (fatty) amine or a fatty acid, p being 1 to 10, preferably 2 to 3, q being 1 to 20, preferably 1 to 10, and r being 1 to 200, preferably 10 to 60.

The additive is optionally applied onto an inorganic carrier in all instances except where X is (6) only a fatty acid residue $-OCCR'$, in which instance the additive must be applied onto the inorganic carrier.

DETAILED DESCRIPTION OF THE INVENTION

Humic acids are amorphous compounds which are formed in the soil from decaying starting material, predominately of vegetable origin, by means of chemical or biological reactions. Humic acids are not a well-defined compound, but rather a mixture of polymers containing aromatic and heterocyclic structures, carboxyl groups, and nitrogen [see: The Condensed Chemical Dictionary, 10th ed., Van Nostrand Reinhold Co., N.Y.C. (pub.) 1981]. They form a group of strongly adsorbant substances having high molecular weights, which, e.g., occur in decomposed plant parts, peat and lignite coal, but not in hard coal, and probably have been formed from decomposed lignin. The humic acids possess carboxyl groups as well as phenolic hydroxyl groups and are alkali-soluble. Lignite coal dust (lignite) has proven to be an inexpensive raw material containing a high amount of humic acids, which lignite may be directly employed according to the invention as the humic acid component. This raw material, depending on the age of the lignite coal, contains varying amounts of humic acids. The experiments resulting in the present invention used lignite coal dust having an average humic acid content of 60%. Desirably, the lignite coal dust is finely ground.

The fluid loss additive according to the invention may be readily prepared directly from the component without concomitant use of a solvent and without heating.

In the inventive process a metal alcoholate of the general formula $$M(OR)_v \qquad (II)$$

is reacted with at least one compound providing the group X in a mol ratio of 1:<4, preferably 1:(1-2). This reaction optionally may be conducted in the presence of a catalyst such as a tertiary amine. The reaction product is then optionally adhered (i.e. absorbed or adsorbed) onto an inorganic carrier, except where X is a fatty acid alone, in which instance the application to the inorganic carrier is required. The reaction product then is reacted with humic acid or a humic acid-containing product, preferably in the absence of a solvent.

The preferred metal alcoholate in the inventive process is a titanium alcoholate having the formula $$Ti(OR)_4. \qquad (III)$$

The fatty acids, alcohols, and the like, described herein are preferably derived from natural sources, which means that they are mixtures of varying chain length, degree of saturation, etc. For this reason, it must be understood that a designated chain length, etc., refers to the predominant compound for purposes of identification, but includes other closely related compounds.

The OR moiety designates an alcohol residue, in general a linear or branched $C_{1-10}$-alkoxy in which R is methyl, ethyl, n-propyl, i-propyl, n-butyl, i-butyl, sec-butyl, tert-butyl, n-pentyl, n-hexyl, n-helptyl, n-octyl, n-nonyl, n-decyl or a corresponding branched higher $C_{6-10}$ alkyl. These preferred compounds are derived from the hypothetic orthotitanic acid and may also be designated as titanium(IV)-alkoxides. Particularly preferred are tetrapropyl titanate, tetraisopropyl titanate and tetrabutyl titanate, which are colorless liquids.

As stated, these alcoholates are reacted with a compound providing the group X.

In the course of this reaction the following groups of derivatives are formed:

(1) Fatty acid alkoxylate derivatives $Ti(OR)_{4-n}((A)_pOOCR^1)_n$ Where $(A)_pOOCR^1$ is the fatty acid alkoxylate moiety;

(2) Fatty alcohol polyalkylene glycolether derivatives $Ti(OR)_{4-n}((A)_p-OR^2)_n$ Where $(A)_pOR^2$ is the fatty alcohol polyalkylene glycolether moiety;

(3) Amine alkoxylate derivatives $Ti(OR)_{4-n}((A)_qNHR^1)_n$ Where $(A)_qNHR^1$ is the long-chain amine alkoxylate moiety which is optionally substituted with a hdroxyl group;

(4) Polyalkoxylate derivatives $Ti(OR)_{4-n}((A)_r-Y)_n$ Where $(A)_r-Y$ is the water-insoluble polyalkoxylate moiety;

n being equal to or larger than 1, but smaller than or equal to 3.

In the titanium alcoholate preferred to be used, theoretically all of the alcoholate groups could be replaced by a radical X, i.e. in the titanium compounds the mol ratio of the alcoholate to the X-providing compound in theory could be 1:4. However, since at least one alcoholate group must remain unsubstituted to afford a further linkage to the humic acid, n in the inventive titanate compounds must be less than 4, i.e. in general n must not be greater than 3 (i.e. a mol ratio of 1:1-3). Preferably the mol ratio is 1:1-2.

A in the above derivatives is at least one alkylene oxide adduct derived from ethylene oxide, propylene oxide, or butylene oxide, having the general formulae $$(OCHR^3CH_2) \text{ or } (OCH_2CHR^3),$$

wherein $R^3$ may be H, methyl or ethyl.

These alkylene oxide adducts may be combined with each other in the components of the above radical X in any optional manner, so that either chains of similar alkylene oxide adducts or combinations of any of the alkylene oxide adducts are formed. In the fatty acid alkoxylates, the fatty alcohol polyalkylene glycol ethers, and long-chain amine alkoxylates, a combination comprising two of these alkylene oxide adducts is preferred.

In the above, p, q, and r, independently represent the number of combinations of the same or different alkylene oxide groups, and have the value above indicated.

For X, suitable fatty acids are linear or branched $C_{5-40}$-alkyl carboxylic acids or $C_{5-40}$-alkenyl carboxylic acids and the dimerization products thereof having up to 44 carbon atoms and cycloalkyl fatty acids, preferably those having from 12 to 22 carbon atoms. Examples of such are lauric acid, myristic acid, pentadecanoic acid, palmitic acid, heptadecanoic acid, stearic acid, nonadecanoic acid, arachinic acid, heneicosanoic acid, behenic acid, myristoleic acid, palmitoleic acid, petroselic acid, petroselaidic acid, oleic acid, elaidic acid, linolic acid, linolaidic acid, linolenic acid, alpha-elaeostearic acid, betaelaeostearic acid, gadoleic acid, arachidonic acid, erucic acid, brassidic acid and clupanodonic acid, branched fatty acids with the above number of carbon atoms and the mixtures thereof. Particularly preferred are oleic acid or the mixtures of such compounds obtainable from naturally occurring fats and oils. Commercially available oleic acid may be defined as a "mixed $C_{18}$ unsaturated fatty acid", for which a typical composition will be found in Example 5, infra. Especially useful is where X is at least partially derived from commercial fatty acid mixtures such as coconut oil, tallow, and/or tall oil, and the like.

The reaction of the fatty acid with the alkylene oxide(s) is carried out in a known manner.

Particularly preferred fatty acid alkoxylates include oleic acid alkoxylate or technical fatty acid mixtures containing oleic acid and/or other unsaturated fatty acids which have from 2 to 4 alkylene oxide units.

Suitable fatty alcohols are linear or branched $C_{8-28}$-alkanols or linear or branched $C_{8-28}$-alkenols, preferably those comprising from 12 to 22 carbon atoms. Examples thereof are lauryl alcohol, tridecanol, myristyl alcohol, pentadecanol, cetyl alcohol, heptadecanol, stearyl alcohol, nonadecanol, arachidyl alcohol, heneicosanol, behenyl alcohol, oleyl alcohol, elaidyl alcohol, ricinol alcohol, linoleyl alcohol, linolenyl alcohol, gadoleyl alcohol, arachidon alcohol, eruca alcohol and brassidyl alcohol, branched fatty alcohols having this number of carbon atoms and mixtures thereof. Particularly preferred are oleyl alcohol and cetyl alcohol or mixtures of these compound obtainable from natural fats and oils. Particularly preferred fatty alcohol polyalkylene glycol ethers are oleyl polyalkylene glycol ether and cetyl alcohol polyalkylene glycol ether having 2 to 4 alkylene oxide adduct units.

The reaction of the fatty alcohol with the alkylene oxide(s) is carried out in a known manner.

Long-chain alkylamines or long-chain alkyleneamines which optionally may be substituted with a hydroxyl moiety are those comprising 5 to 40 (preferably 12 to 22) carbon atoms.

The reaction of the long-chain alkylamines or long-chain alkyleneamines with the alkylene oxide(s) is carried out in a known manner. Preferred is the use of a long-chain amine alkoxylate possessing from 5 to 15 mols of alkylene oxide and optionally substituted with a hydroxyl moiety.

The reaction products with the preferably used titanium tetraalkoxylate not only may be reacted with the humic acid-containing product in the pure state, but also optionally may be reacted when applied onto an inorganic carrier, except when X is only a fatty acid, in which instance the inorganic carrier is required.

Inorganic carriers which may be used include porous materials such as silica, hydrophobized silica, kieselguhr (diatomite), talc or zeolite, in which the proportion of the (liquid) metal alcoholate may amount to up to 55%.

Furthermore, there may be used mixtures of the reaction products of the preferred titanium tetraalkoxylates with fatty acid alkoxylates, fatty alcohol polyalkylene glycol ethers, aminoalkoxylates and/or polyalkoxylates, which have optionally been admixed with up to 75%, (preferably up to 50%, most preferably up to 25%) by weight of fatty acid, either with or without the addition of an inorganic carrier material.

The reaction of the particularly preferred tetraisopropyl titanate with alkoxylates is most conveniently effected by the dropwise slow addition (with stirring and, if required, cooling) of 1 to 2 mols of the alkoxylate, alkoxylate mixtures, or of mixtures thereof with fatty acids, optionally with the addition of the previously disclosed catalyst to the tetraisopropyl orthotitanate.

The reaction product of the first process step is then reacted with humic acid or a humic acid-containing product, preferably in the absence of a solvent. To achieve this a preferably finely ground lignite coal dust is mixed in a paddle mixer or powder mixer, under continuous agitation with the preferably employed titanium derivative, but without heating, for example by spraying the titanium product onto the lignite dust with continuous stirring. In the course of this reaction the temperature automatically increases, depending on the addition rate, to 30° C. to 40° C. However, in general cooling will not be necessary. In this reaction, the various hydroxy and carboxyl groups and other groups providing readily removable protons of the humic acid serve as sites of attack for the respective titanium derivatives whereby linking occurs with removal of an alcoholate moiety from the titanium derivative.

In general, the weight ratio of the inventive titanium compound to the employed lignite coal dust is 1:1–10, preferably 1:2–6, which ensures the formation of a flowable final product. If the one or more of the inventive titanium compounds have been applied onto a carrier support, then the weight ratio of titanium compound to lignite coal dust ratio should be 1:0.11–9; preferably 1:2.33–4.

In a first preferred embodiment of the inventive process a metal alcoholate of the above-defined general formula $M(OR)_y$ is reacted with (1) at least one fatty acid alkoxylate having from 2 to 4 alkylene oxide units, with the possible addition of one or more fatty acids, in an alkoxylate:fatty acid mol ratio of 1:1–2, if required with cooling, at a temperature of 20° C. to 60° C., the reaction product of this metal alcoholate of the above-defined formula $M(OR)_y$ optionally being applied onto an inorganic carrier. The reaction product is subsequently sprayed on or mixed with a finely ground lignite coal dust kept in continuous motion, in a mol ratio of 1:1–10.1, or 1:0.11–9 if the inorganic carrier is present.

In a second preferred embodiment of the inventive process (2) at least one fatty alcohol polyalkylene glycol ether having from 2 to 4 alkylene glycol units, is substituted for the fatty acid alkoxylate, all other conditions being the same.

In a third preferred embodiment of the inventive process (3) at least one (a) aminoalkoxylate or (b) hydroxyaminoalkoxylate having from 5 to 15 alkylene oxide units, is substituted for the fatty acid alkoxylate, all others conditions being the same.

In a fourth preferred embodiment of the inventive process (4) at least one water-insoluble polyalkoxylate having from 10 to 60 alkylene oxide units, is substituted for the fatty acid alkoxylate, all other conditions being the same.

In a fifth preferred embodiment of the inventive process (5) a mixture of fatty acid alkoxylates, fatty alcohol polyalkylene glycol ethers, aminoalkoxylates or hydroxyaminoalkoxylates or polyalkoxylates in accordance with embodiments one to four, is substituted for the fatty acid alkoxylate, all other conditions being the same.

In a sixth preferred embodiment of the inventive process the metal alcoholate is reacted only with (6) at least one fatty acid in a mol ratio of 1:1–2, other conditions being the same, with the important exception that the inorganic carrier must be present, and is not optional.

In the embodiments as described above a tetraalkyl orthotitanate is preferred, and tetraisopropyl titanate is particularly preferred.

In the final reaction step the titanium compound is strongly linked to the humic acid molecule by means of a covalent bond, whereby an extremely temperature-stable product is obtainable which is particularly suitable as a fluid loss additive.

Although all of the above mentions only titanium, which is preferred, it should be understood that zirconium and vanadium are also contemplated.

The additive preparable according to the described process may beneficially be used for preparing a drilling fluid protected from loss of liquid, and more specifically a drilling fluid based on a water-in-oil emulsion.

The amount of additive to be added to the drilling fluid according to the invention depends on the type of the drill hole, the drilling procedure and other conditions. In general it is minimally a fluid-loss-preventive-effective amount, and preferably the amount is from 1 to 20 wt. %, more preferably from 1 to 5 wt. %, based on the weight of the drilling fluid prior to addition.

The fluid loss upon use of the typical oil-based drilling fluid as described below with the use of the fluid loss additives according to the invention as prepared in Examples 1 through 12 was determined as follows:

Investigation of the Ageing of Drilling Fluids and

Determination of High Temperature/High Pressure (HTHP) Fluid Loss

The fluid is filled into an ageing pressurized cell which is places in a roll-oven. The oven (from Juergens Co.) is equipped with rollers which will roll the autoclave at 177° C. for 16 hours.

After cooling, the autoclave is opened, and the fluid is removed therefrom for the determination of the HTHP Fluid Loss.

The HTHP Fluid Loss is determined according to the API Standard Procedure for Testing Drilling Fluids (API RP 13 B) at 34.48 bar (500 psi) and 177° C. (about 80° F.).

Preparation of an Oil-Based Fluid

For the preparation of a typical oil-based drilling fluid as used for all further comparative tests, the chemicals listed below were combined in the sequence as described using a multi-mixer (from Juergens Co.,) maintaining the periods of stirring as indicated.

| Ingredient | Period of Stirring (Position 6) |
|---|---|
| 168 ml of diesel oil | 1 minute |
| 6 g of Invermul TM* | 1 minute |
| 3 g of Ca(OH)$_2$ | 1 minute |
| 6 g of Fluid Loss Additive | 1 minute |
| 3 g of EZ-mul TM* | 1 minute |
| 73 ml of a 45% CaCl$_2$.2H$_2$O solution | 10 minutes |
| 2 g of Geltone TM** | 15 minutes |
| 167 g of baryte (barium sulfate) | 10 minutes |

*a trademark of Bariod div., National Lead Co. for amidoamine amine basic emulsifier.
**a trademark of Bariod div., National Lead Co. an organophilic bentonite colloid gel imparter.

In addition to this fluid used as the standard fluid for the tests, the following variations are conventional, depending on the practical requirements:

168 ml of diesel oil or mud oil such as, e.g., BP TM 83 HF, Conoco TM oil, etc.

6 to 12 g of primary and secondary emulsifier 1 to 3 g of Fluid Loss Additive up to 80 ml of CaCl$_2$ solution or another electrolyte solution 1 to 3 g of organophilic bentonite up to 400 g of baryte, depending on the need for weighting.

EXAMPLE 1

The described reaction product of tetraisopropyltitanate with fatty acid alkoylates (mol ratio 1:1.3) was thoroughly mixed with lignite coal dust, and the HTHP Fluid Loss was measured after ageing (16 h at 177° C.).

| Alkoxylate | % by weight based on lignite coal | HTHP-Fluid Loss ml |
|---|---|---|
| (a) Oleic Acid + 3 E.O.* | 20 | 19 |
| (b) Oleic Acid + 3 E.O.* | 30 | 9 |
| (c) Oleic Acid + 2.5 P.O.* | 30 | 15 |
| (d) Oleic Acid + 2.5 E.O. | 30 | 7 |
| (e) Market product** | 30 | 32 |
| (f) Blank value without Fluid Loss Additive | — | 95 |

E.O.: Ethylene oxide; P.O.: Propylene oxide
**As the market product there was employed a lignite which had been hydrophobized according to the slurry process and which in addition contained asphalt.

EXAMPLE 2

The described reaction product of tetraisopropyltitanate with fatty alcohol alkoxylates (mol ratio 1:1.3) was thoroughly mixed with lignite coal dust, and the HTHP Fluid Loss was measured after ageing.

| Alkoxylate | % by weight based on lignite coal | HTHP-Fluid Loss ml |
|---|---|---|
| (a) Oleyl/Cetyl Alcohol + 2 E.O. | 30 | 23 |
| (b) C12/18 Alcohol +2. E.O. + 4 P.O. | 30 | 29 |

EXAMPLE 3

The described reaction product of tetraisopropyltitanate with aminoalkoxylates (mol ratio 1:1.3) was thoroughly mixed with lignite coal dust, and the HTHP Fluid Loss was measured after ageing.

| Aminoalkoxylate | % by weight based on lignite coal | HTHP-Fluid Loss ml |
|---|---|---|
| (a) C12/14-Olefin Epoxide + Diethanolamine + 10 P.O. | 20 | 17 |
| (b) C12/14-Olefin Epoxide + Diethanolamine + 10 P.O. | 30 | 5 |
| (c) C12/16-Olefin Epoxide + Diethanolamine + 5 P.O. | 25 | 13.5 |
| (d) Dodecylamine + 10 P.0. | 30 | 20 |

EXAMPLE 4

The described reaction product of tetraisopropyltitanate with polyalkoxylates (mol ratio 1:1.3) was thoroughly mixed with lignite coal dust, and the HTHP Fluid Loss was measured after ageing.

| Alkoxylate | % by weight based on lignite coal | HTHP-Fluid Loss ml |
|---|---|---|
| (a) Propylene Glycol 2020* | 30 | 22 |
| (b) Polyglycerol + 22 P.O. | 30 | 24 |

*a product of Chemische Werke Huls, Germany, Mw about 2,000.

EXAMPLE 5

A mixture comprising 85 parts of lignite and 15 parts of powdery hydrophobizing agent, namely 50 parts of hydrophobized silica R972, (a product of DEGUSSA, AG, Frankfürt, Germany) 50 parts of a reaction product of tetraisopropyltitanate and a mixed $C_{18}$ unsaturated fatty acid (2–3 E.O.) alkoxylate▽ (mol ratio of 1:1.3) was investigated for its Fluid Loss property. After ageing, a HTHP Fluid Loss of 17 ml was found.

▽ as used herein and in the following examples, a "mixed $C_{18}$ unsaturated fatty acid" refers to a mixture having approximately the following composition:

$C_{14-18}$ (saturated)-about 8% by weight
$C_{18}$ (2 double bond)-about 60% by weight
$C_{18}$ (2 double bonds)-about 20% by weight
$C_{18}$ (3 double bonds)-about 10% by weight
above $C_{18}$ (unspecified)-about 2% by weight.

EXAMPLE 6

A mixture comprising 85 parts of lignite and 15 parts of powdery hydrophobizing agent, namely
50 parts of silica R972,
50 parts of a reaction product of tetraisopropyltitanate and a hydroxyamine (=12/14 α-olefin epoxide+diethanolamine)+10 E.O. (mol ratio of 1:2)
was investigated for its Fluid Loss property. After ageing, a
HTHP Fluid Loss of 14 ml was found.

EXAMPLE 7

A mixture as described in Example 6, except for kieselguhr (diatomite) having been used instead of silica R 972, was investigated for its Fluid Loss property. After ageing, a HTHP Fluid Loss of 21 ml was found.

EXAMPLE 8

A mixture comprising 85 parts of lignite and 15 parts of powdery hydrophobizing agent (i.e. inorganic carrier), namely 35 parts of hydrophobized silica [Sipernat ™ D17, a product of DEGUSSA AG Frankfürt Germany], and
65 parts of a reaction product of tetraisopropyltitanate and a mixed $C_{18}$ unsaturated fatty acid▽ (mol ratio of 1:1.3) was investigated for its Fluid Loss property. After ageing, a HTHP Fluid Loss of 9 ml was found.

▽ see Example 5 for composition

EXAMPLE 9

A mixture comprising 85 parts of lignite and 15 parts of powdery hydrophobizing agent, namely 35 parts of hydrophobized silica [Sipernat ™ D17], and 65 parts of a reaction product of tetraisopropyltitanate and a mixed $C_{18}$ unsaturated (2–3 E.O.) fatty acid alkoxylate▽ (mol ratio of 1:1.3) was investigated for its Fluid Loss property. After ageing, a HTHP Fluid Loss of 6 ml was found.

▽ see Example 5 for composition

EXAMPLE 10

A mixture comprising 85 parts of lignite and 15 parts of powdery hydrophobizing agent (i.e. inorganic carrier), namely 50 parts of hydrophobized silica R972, and 50 parts of a reaction product of tetraisopropyltitanate and a mixed $C_{18}$ unsaturated fatty acid▽ (mol ratio of 1:1.3) was investigated from its Fluid Loss property. After ageing, a HTHP Fluid Loss of 18.5 ml was found.

▽ see Example 5 for composition

EXAMPLE 11

A mixture comprising 85 parts of lignite and 15 parts of powdery hydrophobizing agent, namely 35 parts of hydrophobized silica Sipernat ™ D17, and 65 parts of a reaction product of tetraisopropyltitanate and a mixture of 50 parts of mixed $C_{18}$ unsaturated fatty acid▽ and 50 parts of mixed $C_{18}$ unsaturated fatty acid# (2–3 E.O.) alkoxylate▽ (mol ratio of 1:1.3) was investigated for its Fluid Loss property. After ageing, a HTHP Fluid Loss of 9 ml was found.

▽ see Example 5 for composition

EXAMPLE 12

A mixture comprising 85 parts of lignite and 15 parts of powdery hydrophobizing agent, namely 50 parts of hydrophobized silica R972, 50 parts of a reaction product of tetraisopropyltitanate and a mixture of 50 parts of mixed $C_{18}$ unsaturated fatty acid▽ and 50 parts of mixed $C_{18}$ unsaturated fatty acid (2–3 E.O) alkoxylate▽ (mol ratio of 1:1.3) was investigated for its Fluid Loss property. After ageing, a HTHP Fluid Loss of 16.5 ml was found.

▽ see Example 5 for composition

SUMMARY OF TEST RESULTS

| Example | Invention Embodiment | HTHP Fluid Loss (ml) |
|---|---|---|
| 1. a | 1 | 19 |
| b | 1 | 9 |
| c | 1 | 15 |
| d | 1 | 7 |
| e | (comparison) | 32 |
| f | (comparison) | 95 |
| 2. a | 2 | 23 |
| b | 2 | 29 |
| 3. a | 3a | 17 |

-continued

| Example | Invention Embodiment | HTHP Fluid Loss (ml) |
|---|---|---|
| b | 3a | 5 |
| c | 3a | 13.5 |
| d | 3a | 20 |
| 4. a | 4 | 22 |
| b | 4 | 24 |
| 5. | 1 | 17 |
| 6. | 3b | 14 |
| 7. | 3b | 21 |
| 8. | 6 | 9 |
| 9. | 1 | 6 |
| 10. | 6 | 18.5 |
| 11. | 5 | 9. |
| 12. | 5 | 16.5 |

In determining the value of compounds as fluid loss additives, an HTHP Fluid Loss of less than 30 ml is acceptable, 25 ml or less is preferred, 20 ml or less more preferred, and 10 ml or less most preferred. The value of the compounds may also be affected by other factors, such as stability, handling properties, toxicology, availability of raw materials, and the like.

We claim:

1. An additive for well drilling fluids, consisting essentially of the organometal compound:

$$L_xM(OR)_yX_z \qquad (I)$$

wherein:

L is at least one humic acid derivate moiety;
M is titanium, zirconium or vanadium;
R is a $C_{1-10}$-alkyl;
X is
   (1) a fatty acid alkoxylate residue $—(A)_p—OOCR^1$;
   (2) a fatty alcohol polyalkylene glycol ether residue $—(A)_p—OR^2$;
   (3) an aminoalkoxylate residue $—(A)_q—NHR^1$ optionally substituted with a hydroxyl;
   (4) a water insoluble polyalkoxylate residue $—(A)_r—Y$;
   (5) any mixture of (1) to (4); optionally admixed with at least one fatty acid residue $—OOCR^1$ in a mol ratio of about 1:1-2; or
   (6) only at least one fatty acid residue $—OOCR^1$;
x is an integer from 1 to 4;
z is an integer from 1 to 4;
y is v-(x+z), where v is the valence of M; and
in which;
$R^1$ is a $C_{5-40}$-alkyl or $C_{5-40}$-alkenyl;
$R^2$ is a $C_{8-28}$-alkyl or $C_{8-22}$-alkenyl;
A is an adduct of alkylene oxide, propylene oxide, butylene oxide, or any combination thereof;
Y is a $C_{1-6}$ mono-, di-, or poly-hydric alcohol, fatty amine, or fatty acid;
p is an integer from 1 to 10;
q is an integer from 1 to 20; and
r is an integer from 10 to 200;
or the above organometal compound optionally applied onto an inorganic carrier, except where X is (6), in which instance said organometal compound must be applied to said inorganic carrier.

2. The additive of claim 1 wherein L is derived from lignite.

3. The additive of claim 1 wherein M is titanium.

4. The additive of claim 1 wherein M is titanium and v is 4.

5. The additive of claim 1 wherein R is a $C_3$ alkyl or $C_4$ alkyl.

6. The additive of claim 1 wherein R is propyl, isopropyl, or butyl.

7. The additive of claim 1 wherein X is:
   (1) a fatty acid alkoxylate residue $—(A)_p—OOCR^1$; optionally with the presence of
   (6) at least one fatty acid residue $—OOCR^1$; and $R^1$ is at least one $C_{12-22}$-alkyl and/or $C_{12-22}$-alkenyl.

8. The additive of claim 1 wherein X is:
   (2) a fatty alcohol polyalkylene glycol ether residue $—(A)_p—OR^2$ optionally with the presence of
   (6) at least one fatty acid residue $—OOCR^1$; $R^1$ is at least one $C_{12-22}$-alkyl and/or $C_{12-22}$-alkenyl; and $R^2$ is at least one $C_{8-22}$-alkyl and/or a $C_{8-22}$-alkenyl.

9. The additive of claim 1 wherein X is:
   (3) an aminoalkoxylate residue $—(A)_q—NHR^1$ optionally substituted with a hydroxyl; and optionally with the presence of
   (6) at least one fatty acid residue $—OOCR^1$; and $R^1$ is at least one $C_{12-22}$-alkyl and/or $C_{12-22}$-alkenyl.

10. The additive of claim 1 wherein X is:
    (4) a water soluble polyalkoxylate residue $—(A)_r—Y$; optionally with the presence of
    (6) at least one fatty acid residue $—OOCR^1$; and $R^1$ is at least one $C_{12-22}$-alkyl and/or $C_{12-22}$-alkenyl.

11. The additive of claim 1 wherein X is:
    (5) any mixture of (1) to (4); optionally with the presence of
    (6) at least one fatty acid residue $—OOCR^1$; and $R^1$ is a $C_{12-22}$-alkyl or $C_{12-22}$-alkenyl.

12. The additive of claim 1 wherein X is:
    (6) only at least one fatty acid residue $—OOCR_1$;
    $R^1$ is a $C_{12-22}$-alkyl or $C_{12-22}$-alkenyl; and
    said inorganic carrier is present.

13. The additive of claim 1 wherein:
    p is 2 to 3;
    q is 1 to 10; and
    r is 10 to 60.

14. The additive of claim 1 wherein X is (5), and said fatty acid residue is present in a mol ratio of the residues of (1) to (4) to the fatty acid residue of 1:1-2.

15. The additive of claim 1 wherein X is (5), and said fatty acid residue comprises up to 75% of the total weight of X.

16. The additive of claim 1 wherein X is (5), and said fatty acid residue comprises up to 50% of the total weight of X.

17. The additive of claim 1 wherein X is (5), and said fatty acid residue comprises up to 25% of the total weight of X.

18. The additive of claim 1 wherein X is at least partially derived from coconut oil, tallow, and/or tall oil.

19. The additive of claim 1 wherein:
    L is derived from lignite;
    M is titanium and v is 4;
    R is a $C_3$-alkyl or $C_3$-alkenyl;
    $R^1$ is at least one $C_{12-22}$-alkyl and/or $C_{12-22}$-alkenyl,
    $R^2$, if present, is at least one $C_{8-22}$-alkyl and/or $C_{8-22}$-alkenyl;
    p, if present, is 2 to 3;
    q, if present, is 1 to 10; and
    r, if present, is 10 to 60.

20. A process for the preparation of the compound of claim 1 comprising:
    (A) reacting
       (1) a metal alcoholate of the formula $M(OR)_v$, with (2) at least one compound affording the residue X, in a mol ratio (1):(2) of about 1:1-2, and optionally in the presence of a reaction catalyst;

(B) optionally applying the product of (A) onto an inorganic carrier where X is any one of (1) to (5), or mandatorily applying the product of (A) onto an inorganic carrier where X is (6); and (C) reacting the product of (B) with humic acid or a humic acid containing material.

21. The process of claim 20 wherein said humic acid or humic acid containing material is lignite, utilized in a weight ratio to the product of (A) of about 1-10:1.

22. The process of claim 21 wherein said lignite is a finely ground dust, and is kept under continuous agitation while the product of (A) is applied thereto.

23. The process of claim 21 wherein said inorganic carrier is present and the weight ratio of lignite: product of (A) is about 1:2.33-4.

24. A process for the preparation of the compound of claim 7 comprising:

(A) reacting
  (1) a metal alcoholate of the formula $M(OR)_v$, with
  (2) at least one compound affording the residue X, in a mol ratio (1):(2) of about 1:1-2, optionally in the presence of a reaction catalyst;

(B) optionally applying the product of (A) onto an inorganic carrier; and (C) reacting the product of (A) or (B) with humic acid or a humic acid containing material in a weight ratio to (A) of about 1-10:1, or to (B) of about 0.11-9:1.

25. A process for the preparation of the compound of claim 8 comprising:

(A) reacting
  (1) a metal alcoholate of the formula $M(OR)_v$, with
  (2) at least one compound affording the residue X, in a mol ratio (1):(2) of about 1:1-2, optionally in the presence of a reaction catalyst;

(B) optionally applying the product of (A) onto an inorganic carrier; and (C) reacting the product of (A) or (B) with humic acid or a humic acid containing material in a weight ratio to (A) of about 1-10:1, or to (B) of about 0.11-9:1.

26. A process for the preparation of the compound of claim 9 comprising:

(A) reacting
  (1) a metal alcoholate of the formula $M(OR)_v$, with
  (2) at least one compound affording the residue X, in a mol ratio (1):(2) of about 1:1-2, optionally in the presence of a reaction catalyst;

(B) optionally applying the product of (A) onto an inorganic carrier; and (C) reacting the product of (A) or (B) with humic acid or a humic acid containing material in a weight ratio to (A) of about 1-10:1, or to (B) of about 0.11-9:1.

27. A process for the preparation of the compound of claim 10 comprising:

(A) reacting
  (1) a metal alcoholate of the formula $M(OR)_v$, with
  (2) at least one compound affording the residue X, in a mol ratio (1):(2) of about 1:1-2, optionally in the presence of a reaction catalyst;

(B) optionally applying the product of (A) onto an inorganic carrier; and (C) reacting the product of (A) or (B) with humic acid or a humic acid containing material in a weight ratio to (A) of about 1-10:1, or to (B) of about 0.11-9:1.

28. A process for the preparation of the compound of claim 11 comprising:

(A) reacting
  (1) a metal alcoholate of the formula $M(OR)_v$, with
  (2) at least one compound affording the residue X, in a mol ratio (1):(2) of about 1:1-2, optionally in the presence of a reaction catalyst;

(B) optionally applying the product of (A) onto an inorganic carrier; and (C) reacting the product of (A) or (B) with humic acid or a humic acid containing material in a weight ratio of (A) of about 1-10:1, or to (B) of about 0.11-9:1.

29. A process for the preparation of the compound of claim 12 comprising:

(A) reacting
  (1) a metal alcoholate of the formula $M(OR)_v$, with
  (2) at least one compound affording the residue X, in a mol ratio (1):(2) of about 1:1-2, optionally in the presence of a reaction catalyst;

(B) applying the product of (A) onto an inorganic carrier; and (C) reacting the product of (B) with humic acid or a humic acid containing material in a weight ratio to B of about 0.11-9:1.

30. A method for reducing fluid loss in a fluid inserted into a well to assist well drilling, comprising adding thereto minimally a fluid-loss-preventive-effective amount of at least one compound according to claim 1.

* * * * *